June 11, 1963 V. S. RITCHIE ETAL 3,093,000
CHECK VALVE ASSEMBLY FOR A PROBE
Filed May 27, 1960

INVENTORS
VIRGIL S. RITCHIE
HOWARD F. OGDEN

BY

ATTORNEYS

United States Patent Office 3,093,000
Patented June 11, 1963

3,093,000
CHECK VALVE ASSEMBLY FOR A PROBE
Virgil S. Ritchie, Hampton, and Howard F. Ogden, Denbigh, Va., assignors to the United States of America as represented by the Administrator of the National Aeronautics and Space Administration
Filed May 27, 1960, Ser. No. 32,496
10 Claims. (Cl. 73—384)
(Granted under Title 35, U.S. Code (1952), sec. 266)

The invention described herein may be manufactured and used by or for the Government of the United States of America for governmental purposes without the payment of any royalties thereon or therefor.

The present invention relates to an atmospheric pressure sensing apparatus, and more particularly to an ambient atmospheric pressure sensing device substantially insensitive to static-pressure errors resulting from attitude variations in diverse geometric planes.

A widely used instrument in aerial flight for determining the altitude of an aerial vehicle is the fixed position pressure sensing probe. A number of such probes having circumferentially distributed sensing orifices for aerodynamically reducing static pressure error due to angle of attack variations have been heretofore devised and successfully utilized with present day aircraft. However in aerial vehicles, such for example as missiles or the like, having no particularly defined attitude in flight, static pressure errors generated by non-uniform pressure distribution in any cross sectional area of the probe due to attitude changes of the vehicle in diverse geometric planes have not been found to be compensated for by present day pressure sensing probes. Consequently, accurate altitude determinations cannot be obtained from probe measured ambient atmospheric pressures due to the presence of static pressure error therein. Although rotatable head probes having vanes thereon for maintaining the sensing orifices in proper alignment with the airstream have been devised to compensate for static pressure errors caused by attitude changes in more than one plane, this type probe is not considered entirely suitable due to its inherent complexity of design and the likelihood of malfunctioning from the miniature packaging requirements of the small diameter probes. An additional undesirable feature of the vane rotated probe head is the disturbance generated by the vane in the airflow pattern over the sampling orifices at sonic and supersonic speeds.

Accordingly, it is a principal object of the present invention to provide a novel atmospheric pressure detection apparatus.

Another object of the instant invention is to provide a new and improved atmospheric pressure sensing apparatus substantially free of static pressure errors.

Still another object of this invention is the provision of novel aerodynamic compensation for static pressure errors due to both attitude and position for a barometric sensing device.

A further object of the instant invention is to provide a new and improved atmospheric sensing probe having means for eliminating static pressure errors resulting from attitude variations due to yaw, pitch or roll of an aerial vehicle.

A still further object of this invention is to provide a simple, inexpensive and compact ambient static pressure measuring assembly for use in an aerodynamic probe.

Generally speaking, the foregoing and other objects are accomplished in accordance with this invention by the provision of a segmented miniature assembly capable of being installed in a probe and including a plurality of constricted radial passageways arranged in circular rows and communicating with a pressure averaging chamber common to each row, and valves disposed in the passageways for selectively restricting the pressure inflow to the chambers.

A more complete appreciation of the invention and many of the attendant advantages thereof will be readily apparent as the same becomes better understood by reference to the following detailed description when considered in connection with the accompanying drawing wherein.

Figure 1:
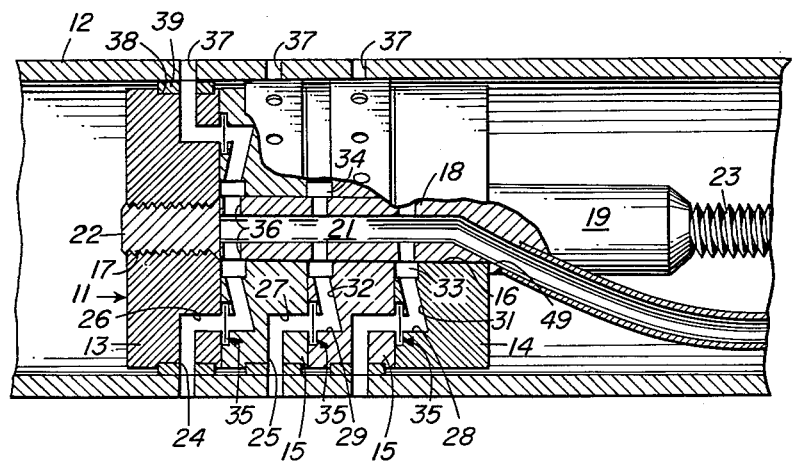
FIG. 1 is an elevational sectional view of the invention.

Referring now to the drawing wherein like reference numerals designate identical or corresponding parts throughout the several views, and more particularly to FIG. 1 the miniature sized pressure sensing assembly, generally designated by reference numeral 11, is shown positioned in a tapering cylindrical probe 12 having a bore size of, for example, less than one inch. The pressure sensing assembly is composed of end annular manifold members 13, 14 and one or more intermediate manifold members 15, each intermediate member being of an identical configuration conforming to that of the probe cross-section. The members 13, 14 and 15 are preferably formed of a high temperature resistant and lightweight material such for example as nylon, or the like; and have a centrally formed bore 16 extending therethrough. The bore of the forward end member 13 is provided with an internal thread 17. A bolt 18 having an enlarged head portion 19, a longitudinal bore 21, and a threaded terminal portion 22 is disposed within the center bores 16 for maintaining circular manifold members 13, 14 and 15 in an axially aligned assembly. The bolt head 19 is provided with a reduced diameter threaded extension, or rod, 23 for selectively positioning the pressure sensor assembly 11 within the probe 12, as will be more fully explained hereinafter.

Manifold members 13 and 15 each have a row of equidistantly spaced radial passageways 24 and 25, respectively, formed about the peripheries thereof. Each of radial passageways 24 and 25 communicates with individual longitudinal passageways 26 and 27, respectively, extending to the rear surfaces of the respective member. Members 14 and 15 of the pressure sensing assembly have longitudinal passageways 28 and 29, respectively, formed in the forward surfaces thereof which are aligned with passageways 26 and 27, respectively, and communicate with individual substantially radial passageways 31 and 32, respectively, radial passageways 31 and 32 communicate with centrally formed circular concavities, or chambers, 33 and 34 respectively. A check valve 35 which permits pressure inflow to the center chambers but prevents pressure outflow therefrom is placed in all but one of each of longitudinal passageways 28 and 29. Spaced pairs of apertures 36 formed in diametrically opposite sides of bolt 18 provide communication between chambers 33, 34 and bore 21. To effect a pressure seal between the peripheral openings 24 and 25 of the pressure sensing assembly 11 and the sampling orifices 37 of the probe 12, a peripheral depression 38 is formed in manifold members 13 and 15 wherein an apertured band 39 of elastic material, such for example as rubber, or the like, is seated. In lieu of an elastic band, it is also contemplated to provide each of the peripheral openings with a circumscribing O-ring formed of neoprene, or the like. It will be readily apparent to one skilled in the art that passageways 26 through 32 are to be of the same small sized diameter to prevent the introduction of pressure lags.

Figure 2:
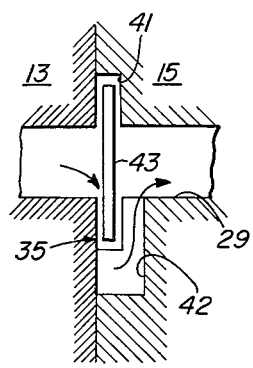
FIG. 2 is an enlarged sectional view of a component in the invention shown in FIG. 1.

The check valve 35 positioned in the longitudinal passageways is preferably of the type shown in detail in FIG. 2. As shown thereon, the inlet 41 of the longitudinal passageway, for example the passageway 29 of first intermediate member 15, is made of a larger diameter than the diameter of the pasageway and is provided with a narrow radial slot, or recess, 42 of greater depth and still larger diameter. A disc shaped valve 43 formed of a thin sheet of highly heat resistant material exhibiting elastic properties, such for example as Viton, Teflon, or the like, is positioned in the inlet chamber. In response to an external local pressure increase, the valve 43 is seated on the bottom surface of the inlet chamber and permits pressure flow through slot 42. In response to an internal pressure increase, however, the seating of the valve on the back face, which is preferably a polished surface, of the preceding abutting member 13 of the assembly 11 prevents any outflow from the center chamber 34 of the member 15. The trapping of airflow pressure within the center chambers due to variations in external local pressures is prevented by the check valve free passageway.

Figure 3:
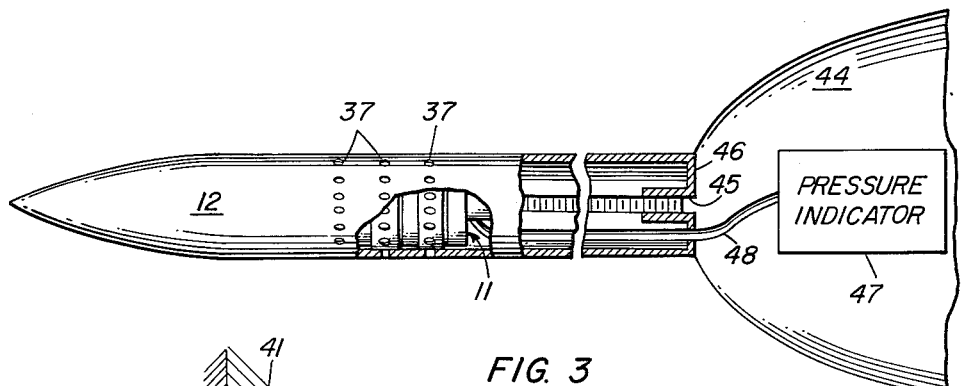
FIG. 3 is an elevational view, partially broken away for clarity of illustration, showing a typical application of the invention.

An example of a typical application of the invention is illustrated in FIG. 3 wherein the probe 12 is axially affixed to the nose of an aerial vehicle 44. The peripheral openings 24 and 25 of the assembly 11 have been aligned with the corresponding orifices 37 formed equidistantly in parallel rows about the probe by selective rotation of threaded rod 23 within the threaded aperture 45 of a probe and plate 46. Communication between the assembly 11 and a conventional pressure indicator 47 carried by the aerial vehicle is provided by a length of flexible pressure tubing 48 having one end thereof firmly secured with an aperture 49 formed in bolt 18 and communicating with the center bore 21 thereof. As is well known, the magnitude of local pressures about the probe surface at any cross-sectional error will not be uniform when attitude changes occur. For example, at an angle of attack greater than zero, the local pressures will be larger than the free-stream static pressure for a peripheral region of about 75° on the lower surface of probe 12. Consequently, a number of the check valves in the passageways communicating with the probe sampling orifices 37 located on the lower probe surface region will permit air pressure inflow into each of the center chambers. The increase in air pressure in the center chambers will, in turn, maintain the check valves in the passageways communicating with the probe sampling orifices located on the upper probe surface closed inasmuch as the local pressures in this region will be less than the freestream pressure. This selective restriction of air flow through the probe by the check valves results in the generation of an average pressure in each of center chambers 33 and 34 of the sensor assembly which is substantially independent of the static-pressure errors present in prior art devices due to attitude changes in any plane.

To eliminate the possibility of introduction of error into the pressure readings supplied to the pressure indicator 47 by the check valve free passageway of sensor assembly 11, it is preferable that several adjacent intermediate members 15 having their check valve free passageways symmetrically spaced around the probe's periphery be included in the assembly. In the event that only one bank of sensing orifices is to be utilized, the orifice is preferably located on the probe surface opposite that of the anticipated air flow impingement surface.

It is to be understood that although the sensor assembly 11 is preferably positioned in the aerodynamic probe adjacent to the sampling orifices thereof to thereby minimize the possibility of error arising from pressure lag effects, as specifically disclosed herein, in applications where excessive surface heating is encountered, the sensor assembly may be located in the aerial vehicle and coupled to the sampling orifices by lengths of pressure tubing. It is also to be understood that the employment of filter elements to keep dust and other foreign particles from entering the orifices and interfering with the proper operation of the check values is also within the contemplation of the present invention.

Obviously many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. An atmospheric pressure sensor comprising a body having at least one row of inwardly extending peripheral orifices formed therein, there being a chamber formed in said body in communication with said orifices, means for simultaneously preventing outward flow and permitting inward flow disposed in a majority of said orifices, and outlet means for connecting said chamber to a pressure measuring device.

2. An atmospheric pressure sensor comprising a cylindrical body having at least one circumferential row of equidistantly spaced orifices inwardly extending into said body and a chamber formed centrally therein in communication with said orifices, a valve disposed in at least one of said orifices, said valve only permitting inflow to said chamber, and conduit means communicating with said chamber for providing an outlet therefrom.

3. An atmospheric pressure sensor comprising a body formed of a plurality of annular manifold members, a bolt extending through the center of each of said annular manifold members and securing them together, said bolt having a longitudinal bore therethrough, at least two of said manifold members having a circumferential row of spaced radially inwardly extending passageways and a plurality of longitudinally extending passageways individually communicating with each of said inwardly extending passageways, means providing pressure communication between said longitudinal passageways and said longitudinal bore, and means for preventing outward flow and permitting inward flow disposed in at least one of said longitudinal passageways.

4. The atmospheric pressure sensor according to claim 3 wherein said longitudinally and radially inwardly extending passageways are of substantially identical diameters.

5. The atmospheric pressure sensor according to claim 3 wherein a circumferential depression is formed in said manifold members about each of said rows of radially inwardly extending passageways, and an apertured resilient band is partially positioned in said depression.

6. In combination, a probe having a tapering nose portion, at least one circumferential row of orifices formed in said probe; a body formed of a high temperature resistant material positioned within said probe and having at least one circumferential row of inwardly extending passageways formed therein, the inlets to said passageways coinciding with the orifices on said probe, there being a chamber formed centrally of said body individually communicating with each circumferential row of passageways, a valve disposed in at least one of said passageways for preventing only outflow from said chamber; pressure indicating means; and means for effecting communication between said chamber and said pressure indicating means.

7. A pressure sensing assembly comprising a plurality of annular manifold members, each having a front face and a back face, means for securing said members together with the back face of a first of said members engaging the front face of a second of said members, said first of said members having a plurality of radially extending orifices and a plurality of axially extending passageways each communicating with said radially extending orifices and said back face of said first member, said second of said members having a plurality of axially extending passageways communicating at said front face of said second member with respective passageways of said first member, valve means disposed in at least one of the said passageways for preventing flow from said second member to said first member and allowing flow from said first member to said second member, and means for connecting said passageways in said second member to a pressure responsive device.

8. The assembly set forth in claim 7, wherein said valve means are disposed in most of said passageways in said second member.

9. The assembly set forth in claim 7, wherein said valve means comprises an enlarged diameter circular chamber formed at the inlet of said passageway in said second member, a relatively narrow extended recess formed in said chamber of greater depth than said chamber, and a thin disc movably positioned in said chamber.

10. The pressure sensing assembly according to claim 7, and including a peripheral depression formed in at least one of said members, and a multi-apertured resilient band disposed in said depression, the outer surface of which protrudes above the outer surface of said member.

References Cited in the file of this patent

UNITED STATES PATENTS

| | | |
|---|---|---|
| 2,101,165 | Cole et al. | Dec. 7, 1937 |
| 2,325,018 | Moss | July 20, 1943 |
| 2,524,747 | Ayres et al. | Oct. 10, 1950 |
| 2,554,634 | Paine et al. | May 29, 1951 |
| 2,662,402 | Ince et al. | Dec. 15, 1953 |
| 2,679,163 | Morris et al. | May 25, 1954 |
| 2,834,208 | Westman | May 13, 1958 |
| 2,923,153 | Westman | Feb. 2, 1960 |
| 3,029,639 | Grossbeck | Apr. 17, 1962 |